United States Patent [19]

Mitchell

[11] Patent Number: 4,999,780
[45] Date of Patent: Mar. 12, 1991

[54] AUTOMATIC RECONFIGURATION OF ELECTRONIC LANDING DISPLAY

[75] Inventor: James E. Mitchell, Renton, Wash.

[73] Assignee: The Boeing Company, Seattle, Wash.

[21] Appl. No.: 319,383

[22] Filed: Mar. 3, 1989

[51] Int. Cl.$^5$ ............... G06F 15/48; G06F 15/50; G01C 21/00; G01C 23/00

[52] U.S. Cl. .................. 364/428; 73/178 T; 340/972; 340/976; 364/424.06

[58] Field of Search ............... 364/428–430, 364/424.01, 424.06; 340/945, 947, 951, 954, 959, 980, 972, 973, 976; 358/103, 104; 434/38, 42–44, 50; 73/178 R, 178 T

[56] References Cited

U.S. PATENT DOCUMENTS

| | | |
|---|---|---|
| 3,515,802 | 6/1970 | Wise . |
| 3,517,122 | 6/1970 | Owen . |
| 3,668,622 | 6/1972 | Gannett et al. . |
| 4,057,782 | 11/1977 | Muller ........................ 340/980 |
| 4,070,662 | 1/1978 | Narveson . |
| 4,147,056 | 4/1979 | Muller ........................ 73/178 T |
| 4,210,930 | 7/1980 | Henry . |
| 4,247,843 | 1/1981 | Miller et al. . |
| 4,348,184 | 9/1982 | Moore . |
| 4,368,517 | 1/1983 | Lovering . |
| 4,490,797 | 12/1984 | Staggs et al. . |
| 4,554,538 | 11/1985 | Bieneman . |
| 4,559,533 | 12/1985 | Bass et al. . |
| 4,561,659 | 12/1985 | Redfield et al. . |
| 4,628,305 | 12/1986 | Ikeda . |
| 4,635,050 | 1/1987 | Grothe et al. . |

Primary Examiner—Parshotam S. Lall
Assistant Examiner—E. J. Pipala
Attorney, Agent, or Firm—Christensen, O'Connor, Johnson & Kindness

[57] ABSTRACT

Automatically reconfiguring an electronic landing display that includes a flight path vector (FPV) symbol and a rising runway symbol combined with a digital altitude value that merge at low aircraft altitudes is disclosed. During approach, when the aircraft descends below a predetermined minimum altitude, e.g., 200 feet, the FPV symbol is removed. When the aircraft is on the ground and during takeoff, the rising runway symbol is removed. Removing one or the other of the merging symbols prevents the symbols from overlapping. Thus, the potential for pilot error due to one of the merging symbols occluding the other is avoided.

9 Claims, 2 Drawing Sheets

AUTOMATIC RECONFIGURATION OF ELECTRONIC LANDING DISPLAY

TECHNICAL AREA

This invention relates to aircraft instrumentation and, more particularly, electronic aircraft flight instrumentation.

BACKGROUND OF THE INVENTION

The introduction of electronic flight instrument systems (EFIS) on board aircraft has resulted in a proliferation of flight display features and options. Unfortunately, certain display symbols are inherently incompatible when simultaneously used on the same display. One display system that includes symbols that are incompatible under certain circumstances are the symbols of an electronic landing display. An electronic landing display is a computer-controlled display that indicates to the pilot of an aircraft the relationship between his aircraft and the runway on which the aircraft is to land based on information derived from various aircraft sensors and indicators, such as a radar altimeter, airspeed indicators thrust indicators, etc. Landing displays may include a flight path vector (FPV) symbol and a runway symbol. As the aircraft approaches the runway during a landing, the FPV and runway symbols of the display merge toward one another. One type of such an aircraft landing display system is described in U.S. Pat. No. 4,368,517, entitled "Aircraft Landing Display System" by Peter Lovering.

Landing display symbol incompatibility occurs because as the FPV symbol and the runway symbol merge the symbols tend to occlude one another. Because the symbols occlude one another, the information provided by the symbols may be erroneously interpreted by a pilot. This possibility becomes greater when the runway symbol rises and includes a radar altitude value in digital form that rises with the runway symbol. Such a display is presently scheduled for inclusion in the electronic flight instrument system (EFIS) designed for the 747-400 airplane produced by The Boeing Company, Seattle, Washington. In this particular instrument, the FPV symbol occludes the digital altitude value when the rising runway symbol and the FPV symbol overlap.

In the past, aircraft instrument systems have often included some provision for solving this incompatibility problem. For example, the flight display system incorporated on the A320 produced by the European Commercial Airplane Manufacturing Consortium, commonly referred to as Airbus, includes a rising runway symbol combined with a radar altitude value and a flight path vector or flight path angle symbol. The Airbus approach to solving the occlusion problem is to allow one symbol to disappear behind the other, somewhat similar to the way personal computer (PC) graphics provide overlapping displays. (The overlapping display solution in the personal computer environment is commonly referred to as a "window display". In such displays, a "window" overlaps the main displays; i.e., the main display disappears behind the window display.)

Flight management displays, including means to eliminate undesired symbols, are also described in U.S. Pat. No. 3,668,622, entitled "Flight Management Display" by James R. Ganett et al. and in U.S. Pat. No. 4,247,843, entitled "Aircraft Flight Instrument Display System" by Harry Miller et al.

While solutions of the type incorporated in the Airbus A320 flight display instrument and described in the foregoing patents reduce the symbol incompatibility problem and/or eliminate undesired symbols, they are not as satisfactory as desired when applied to a landing system. As will be better understood from the following description, the present invention is directed to solving the symbol incompatibility problem in an aircraft landing display system by removing one or the other of the merging symbols depending upon the flight status of the aircraft.

SUMMARY OF THE INVENTION

In accordance with this invention a method and apparatus for automatically reconfiguring an electronic landing display that includes a flight path vector (FPV) symbol and a rising runway symbol combined with a radar altitude value that merge at low aircraft altitudes is disclosed. During approach, when the aircraft descends below a predetermined minimum radar altitude, e.g., 200 feet, the FVP symbol is removed. When on the ground and during the takeoff portion of a flight, the rising runway symbol is removed. The removal of one or the other of the merging symbols prevents the symbols from overlapping. Thus, the potential for pilot error due to one of the symbols occluding the other is avoided. In particular, the potential for pilot error caused by the FPV symbol occluding the radar altitude value is avoided.

In accordance with further aspects of this invention, if the airplane descends below the minimum radar altitude, e.g., 200 feet, and then climbs above the minimum radar altitude, the FPV symbol reappears.

In accordance with further aspects of this invention, during a landing rollout, the rising runway symbol is removed. Preferably, the radar altitude value is also removed, or moved to a nonconflicting region of the display. Further, if previously removed, the FPV symbol will reappear in a parked position.

In accordance with further aspects of this invention, the presence or absence of the FPV and landing runway symbols is controlled by a subroutine of the program that controls the position of these and other symbols of the electronic flight instrument system display. The subroutine, preferably, includes an onground and takeoff section and an approach section.

BRIEF DESCRIPTION OF THE DRAWINGS

The foregoing features and advantages of this invention will become better understood from the following description of the preferred embodiment of the invention when considered in conjunction with the accompanying drawings wherein.

3

DESCRIPTION OF THE PREFERRED EMBODIMENT

Figure 1C:
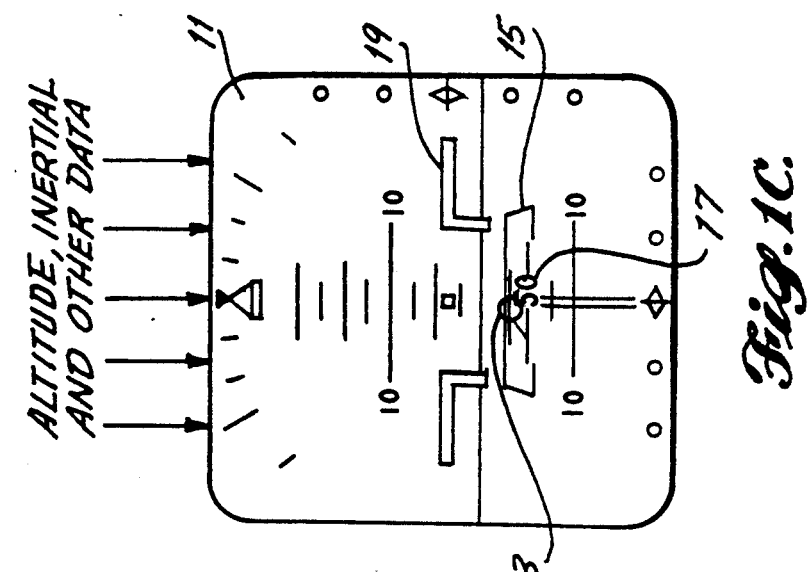
FIGS. 1A-1C are a series of pictorial diagrams illustrating the occlusion that occurs when the FPV and rising runway symbols of an aircraft landing display merge to the point where they overlap.
Figure 1B:
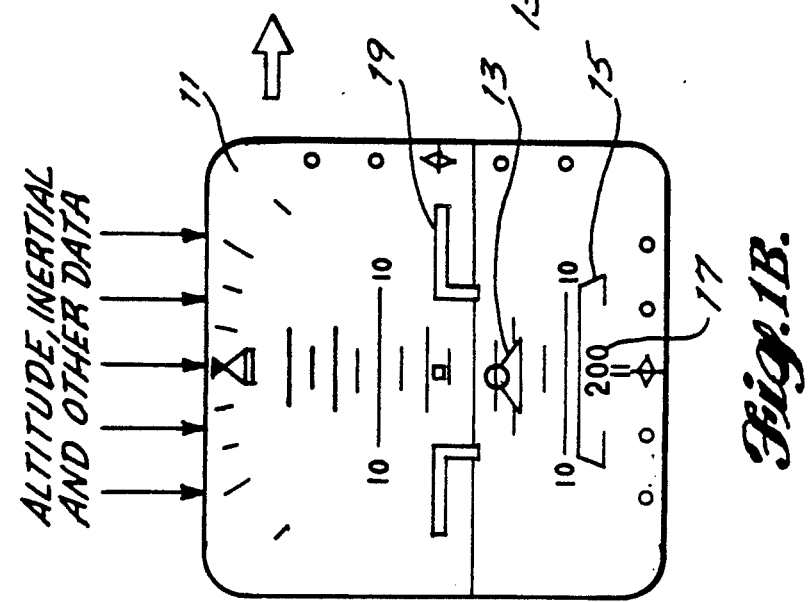
Figure 1A:
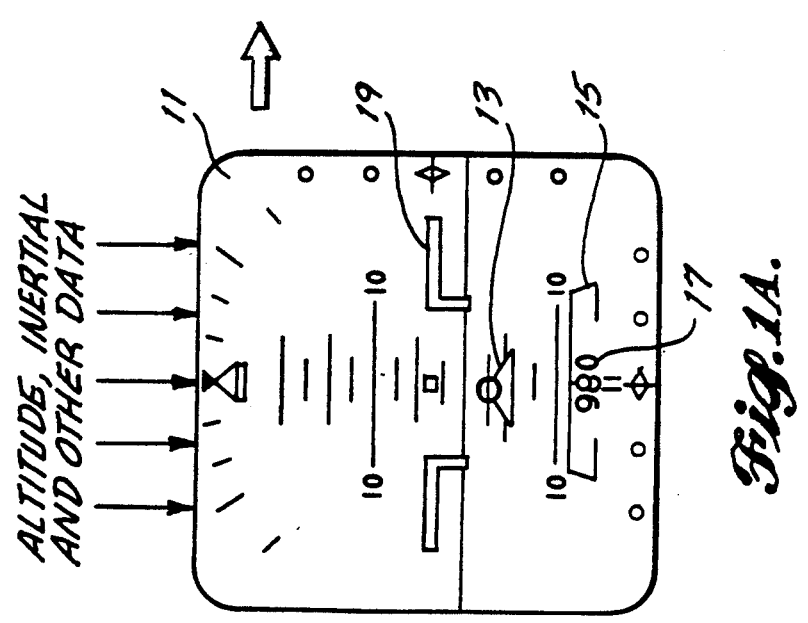

FIGS. 1A–1C are a series of landing displays of the type presently produced by electronic flight instrument systems (EFIS) designed for the 747-400 airplane produced by The Boeing Company. The sequence of displays illustrates the problem solved by the present invention. As will be readily appreciated by those skilled in aircraft instrumentation art, the display symbols illustrated in FIGS. 1A–1C are created and position controlled by an electronic control system based on information the system receives from a variety of aircraft sensors and indicators. While the electronic control system can be a hardwired system, contemporary electronic control systems are general or special purpose data processing devices, i.e., computers, controlled by a suitable program. Examples of electronic control systems suitable for use with various types of aircraft instrumentation displays are described in U.S. Pat. Nos. 3,515,802, 3,668,622 and 4,247,843 as well as many other U.S. and foreign patents. Since, except for the modification provided by this invention, such systems are well known, they are not described here. Further, in order to avoid unduly complicating the drawings, the radar altitude, inertia, thrust, speed and other data received by such electronic control systems from various aircraft sensors and indicators are depicted in FIGS. 1A–1C as going directly to the display, rather than an electronic subsystem that controls the display. Obviously, an actual electronic flight instrument system incorporating the invention would include a central processing unit (CPU) for receiving and manipulating the data produced by the various aircraft sensors and indicators and using the result to control the presence and position of the various display symbols depicted in FIGS. 1A–1C.

The landing display illustrated in FIGS. 1A–1C includes a background 11 upon which a plurality of symbols are displayed. The symbols of the illustrated display provide information that is important to a pilot during a landing maneuver. These symbols include a flight path vector symbol 13, a runway symbol 15 and a radar altitude value 17 in digit form. As will be better understood from the following description, the presence or absence of these three symbols—the FPV symbol 13, the runway symbol 15, and the radar altitude value 17 at relatively low, i.e., landing, altitudes is controlled by the invention. The position of the symbols and the radar altitude values are controlled by electronic systems and/or computer subroutines that do not form part of this invention and, thus, are not described here. In addition to these symbols, the display illustrated in FIGS. 1A–1C includes a number of other symbols the presence or absence of which is not controlled by this invention. These include an airplane symbol 19 and related scales designed to inform a pilot about the operation of the aircraft along its pitch, roll and yaw axes.

The control system that controls the position of the FPV symbol 13 and the rising runway symbol 15, and controls the radar altitude value 17, controls these items such that, at a predetermined altitude, the runway symbol 15 and the radar altitude value begin to rise, as the altitude declines, until a landing takes place. Prior to the present invention, the runway symbol continued to rise until the rising runway symbol 15 and the radar altitude value 17 overlapped the FPV symbol. This action is shown in FIGS. 1A–1C. More specifically, FIG. 1A illustrates the status of the display when the aircraft is substantially above the runway—the radar altitude value 17 illustrated in FIG. 1A is 980 feet. As the aircraft continues to descend, at some point the rising runway symbol 15 and the radar altitude value 17 begin to rise toward the FPV symbole 13. This rise may begin at a 200 foot radar altitude (FIG. 1B), for example. As the altitude of the aircraft continues to decrease, the rising runway symbol 15 and the radar altitude value 17 continue to rise until the rising runway symbol 15 and the radar altitude value 17 overlap the FPV symbol 13. FIG. 1C illustrates the overlap that occurs at a radar altitude value of 50 feet. As clearly shown in FIG. 1C, when the rising runway symbol 15 and the radar altitude value 17 overlap the FPV symbol 13, the radar altitude value 17 becomes difficult to read. Because the radar altitude value is difficult to read, an erroneous reading by a pilot can occur, which could potentially result in damage to an aircraft or its occupants. The present invention is directed to avoiding this problem by removing or deleting one or the other of the merging symbols prior to when they overlap. Which symbol is removed depends upon the flight status of the aircraft.

Figure 2:
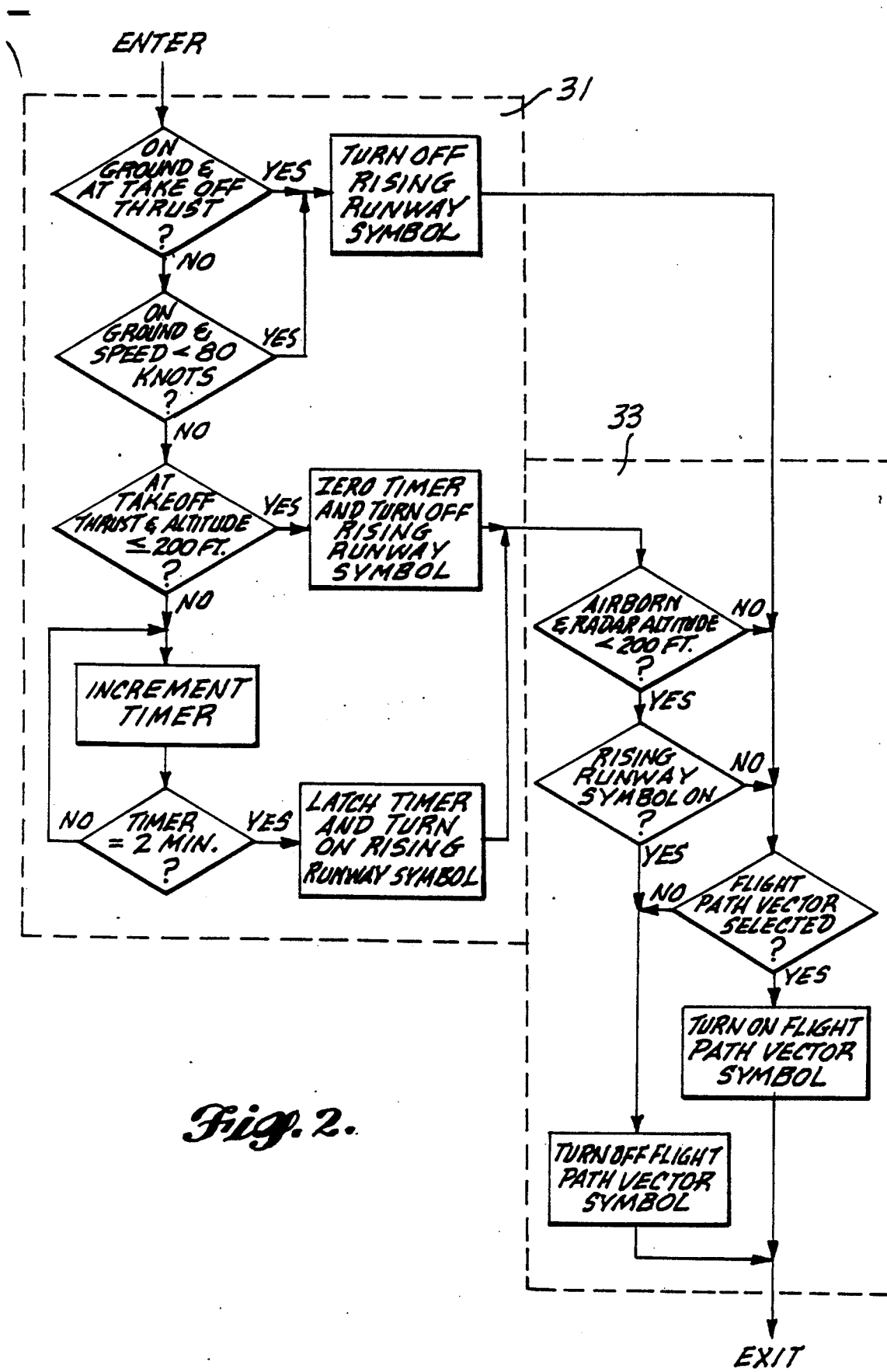
FIG. 2 is a flow diagram illustrating logic formed in accordance with this invention for automatically reconfiguring an aircraft landing display of the type illustrated in FIGS. 1A-1C in a manner that avoids the overlap/occlusion.

Since contemporary equipment for controlling the position and orientation of display symbols is in software form, as illustrated in FIG. 2, the presently preferred way of eliminating one or the other of the FPV and rising runway symbols is by modifying the program that controls the position and orientation of the symbols. Obviously, a hardware version of the software can be used with systems that use hardware to control the position and orientation of flight path vector and rising runway display symbols.

The preferred embodiment of the invention illustrated in FIG. 2 includes two sections—an onground and takeoff section 31 and an approach section 33. In a conventional manner a pass is made through each section during a pass through part of the overall program that controls the position and orientation of the FPV and rising runway symbols. In the illustrated embodiment of the invention, a pass is made through the onground and takeoff section 31 followed by a pass through the approach section 33.

The first step in the onground and takeoff section 31 is a test to determine whether the aircraft is on the ground and at takeoff thrust. If the aircraft is determined to be on the ground and at takeoff thrust, the rising runway symbol 17 is turned off. Thereafter the program cycles to a point in the approach section 33 where a flight path vector selected test is made. If the aircraft is not on the ground and at takeoff thrust a test is made to determine if the aircraft is on the ground and at a speed below 80 knots. If the aircraft is on the ground and at a speed below 80 knots, the runway symbol is turned off and the program cycles to the point in the approach section 33 where the flight path vector selected test is performed. If the aircraft is not on the ground or, if on the ground, is moving at a speed greater than 80 knots, a test is made to determine if the aircraft is at takeoff thrust and the altitude of the aircraft is less than or equal to a predetermined value, such as 200 feet radar altitude. If the aircraft is at takeoff thrust and the altitude is less than or equal to the predetermined value, i.e., 200 feet, a timer is zeroed and the rising runway symbol is turned off. Thereafter the program cycles to a point in the approach section 33 where a test is made to determine if the aircraft is airbone and has a radar altitude greater than 200 feet. If the aircraft is not at takeoff thrust or, if at takeoff thrust but at an altitude greater than 200 feet radar altitude, the timer is incremented. Thereafter a test is made to determine if the timer is equal to 2 minutes. If the timer is not equal to 2 minutes, it is incremented again. The program continues in this loop until the timer value equals 2 minutes. At that point, the timer is latched and the rising runway symbol is turned on. After the timer has been latched and the rising runway symbol is turned on, the program cycles to the point in the approach section 33 where a test is made to determine if the aircraft is airborne and the radar altitude is less than 200 feet.

As noted above and illustrated in FIG. 2, the approach section 33 can be entered in two manners. It can be entered at two different test points. One is a test that determines if the aircraft is airborne and at a radar altitude of less than 200 feet. The other is a test to determine if display of the flight path vector symbol has been selected. If the test to determine if the aircraft is airborne and the radar altitude is less than 200 feet is determined to be negative for either reason, the approach section 33 cycles to the point where the flight path vector selected test is made. If the aircraft is determined to be airborne and at a radar altitude less than 200 feet, a test is made to determine if the rising runway symbol is on. If the rising runway symbol is on, the approach section cycles to the point where the flight path vector selected test occurs. If the rising runway symbol is on, the flight path vector symbol is turned off and the program exits the approach section 33. If the flight path vector has not been selected when this test is performed, the flight path vector symbol is turned off. If the flight path vector has been selected, the flight path vector symbol is turned on. In either case, after the symbol is turned off or on, as the case may be, the program exits the approach section 33.

As will be appreciated by those skilled in the aircraft instrumentation art and others from the foregoing description of FIG. 2, the onground and takeoff section tests determine whether the aircraft is on the ground and either at takeoff thrust or below 80 knots. Under either condition the rising runway symbol is turned off. This assures that when the aircraft is on the ground, the rising runway symbol is turned off. Likewise, if the aircraft is at takeoff thrust but below 200 feet, the rising runway symbol is turned off. When the aircraft rises above 200 feet, a timer is incremented. After two minutes the timer is latched and the rising runway symbol is turned on. Consequently, two minutes after the aircraft rises above 200 feet in altitude, the rising runway symbol is displayed. As depicted in FIG. 1B, at this point the flight path vector and the rising runway symbols are separated by a distance that prevents the FPV symbol from occluding the radar altitude value that rises and falls with the rising and falling of the rising runway symbol.

When the rising runway symbol is turned off due to the fact that the aircraft is on the ground and at takeoff thrust, or on the ground and at a speed less than 80 knots, the flight path vector (FPV) symbol is displayed if selected. If not selected, the flight path vector symbol is also not displayed.

When the aircraft is airborne and the radar altitude is less than 200 feet, the FPV symbol is turned off if the rising runway symbol is on. If the rising runway symbol is not on, and the FPV symbol has been selected, the FPV symbol is turned on.

As will be readily appreciated from FIG. 2 and the previous discussion, above a predetermined radar altitude, namely 200 feet, the FPV symbol is displayed when selected. While not specifically illustrated in FIG. 2, preferably, the rising runway symbol and the radar altitude value are displayed only when the radar altitude of the aircraft is below some predetermined value such as 1,000 or 2,500 feet and the localizer is tuned. During approach, when descending below 200 feet, the flight path vector (FPV) symbol is removed if the rising runway symbol is displayed. The rising runway symbol begins to rise at a predetermined altitude, such as 200 feet above the runway.

If the aircraft descends below 200 feet above the runway during a "go around", the flight path vector (FPV) symbol is removed, as in the approach case. As the aircraft climbs back through 200 feet above the runway, the flight path vector symbol reappears.

At 80 knots calibrated or computed airspeed during a landing roll out, the rising runway symbol is removed. The radar altitude value may be removed or moved to a predetermined location, such as the central lower portion of the display. If previously selected, the FPV symbol will reappear in its parked position (0° flight path angle and 0° drift angle) because the aircraft is on the ground.

During takeoff when the FPV symbol is selected, the radar altitude value remains in the lower center portion of the display and the FPV symbol is displayed in its parked position until the speed of the aircraft reaches 80 knots. Above this speed, the FPV symbol smoothly transitions from its parked position to a position indicating inertial flight path and draft angles, which are under the control of portions of the program not illustrated in FIG. 2 and which do not form a portion of the present invention.

The rising runway symbol is not displayed during takeoff regardless of whether the FPV symbol is selected or the localizer is tuned. The rising runway symbol is removed when the aircraft is on the ground and the speed of the aircraft is below 80 knots regardless of the thrust setting. Above 80 knots on the ground at takeoff thrust (which means that the low pressure rotor speed, i.e., $N_1$, of the aircraft engines is greater than 67% and that the aircraft's thrust reversers are stowed), the rising runway symbol is also removed. As the aircraft climbs to 200 feet radar altitude, a reset timer is started. After 2 minutes, the rising runway inhibit logic is reset. This prevents the rising runway symbol from appearing after takeoff during a normal climb-out. The timer allows the symbol to be reset in time for the next approach.

During touch-and-go landings, the rising runway symbol disappears if the aircraft slows below 80 knots or if takeoff thrust is reached and the aircraft is on the ground. If the aircraft bounces on landing and both the onground and takeoff power tests are momentarily true, the rising runway symbol disappears. In either of the above situations, the FPV symbol will reappear, if previously selected (by portions of the program that do not form a portion of this invention), when the rising runway symbol disappears.

As will be appreciated from the foregoing description, the invention automatically reconfigures an electronic landing display in a manner that prevents merging symbols, namely an FPV symbol and a rising runway symbol in combination with a radar altitude value, from overlapping. Since the symbols cannot overlap, the potential for pilot error due to one of the merging symbols occluding the other is avoided. In general, during approach the FPV symbol is removed when the aircraft descends below a predetermined minimum altitude, such as 200 feet. When the aircraft is on the ground and during takeoff, the rising runway symbol is removed.

While a preferred embodiment of the invention has been illustrated and described, it is to be understood that various changes can be made therein. Consequently, it is to be understood that, within the scope of the appended claims, the invention may be practiced otherwise than as specifically described herein.

The embodiments of the invention in which an exclusive property or privilege is claimed are defined as follows:

1. In an electronic flight instrument system that includes: (i) an electronic landing display that includes a flight path vector (FPV) symbol and a runway symbol that merge toward one another when an aircraft incorporating the electronic flight instrument system descends below a first predetermined altitude above a runway during a landing maneuver; and (ii) a programmable controller for controlling the position and orientation of said FPV and runway symbols of said electronic landing display, the improvement comprising:

means for automatically reconfiguring the electronic landing display by removing said FPV symbol prior to said merging FPV and runway symbols overlapping and occluding one another by programming said programmable controller to remove said FPV symbol from said display when the altitude of said aircraft above said runway drops below a second predetermined value, said second predetermined value being chosen such that said FPV and runway symbols do not overlap when the altitude of said aircraft above said runway drops below said second predetermined value.

2. The improvement claimed in claim 1 including a radar altitude value associated with said runway symbol such that said radar altitude value would be occluded by said FPV symbol if said FPV symbol were allowed to overlap said runway symbol and said radar altitude value.

3. The improvement claimed in claim 2 wherein said runway symbol and said radar altitude value rise toward said FPV symbol when the altitude of said aircraft above said runway drops below said first predetermined value.

4. The improvement claimed in claim 3, wherein said runway signal and said radar altitude value are removed from said display when said aircraft is on the ground.

5. The improvement claimed in claim 4, wherein said runway symbol and said radar altitude value are also removed from said display when the speed of said aircraft is below a predetermined value.

6. The improvement claimed in claim 2, wherein said runway symbol and said radar altitude value are removed from said display when said aircraft is on the ground and at takeoff thrust.

7. The improvement claimed in claim 6, wherein said runway symbol and said radar altitude value are also removed from said display when said aircraft is on the ground and at a speed below 80 knots.

8. The improvement claimed in claim 2, wherein said flight path vector symbol is removed from said display when said aircraft is airborne and said radar altitude value is less than 200 feet.

9. The improvement claimed in claim 8, wherein said flight path vector symbol is removed from said display when said rising runway symbol is being displayed, said aircraft is airborne and said radar altitude value is less than 200 feet.

* * * * *

UNITED STATES PATENT AND TRADEMARK OFFICE
CERTIFICATE OF CORRECTION

PATENT NO. : 4,999,780

DATED : March 12, 1991

INVENTOR(S) : James E. Mitchell

It is certified that error appears in the above-identified patent and that said Letters Patent is hereby corrected as shown below:

| Column | Line | |
|---|---|---|
| 1 | 66 | Delete "undersired" and insert therefor --undesired-- |
| 2 | 7 | After "landing" insert --display-- |

Signed and Sealed this

Twenty-fourth Day of November, 1992

*Attest:*

DOUGLAS B. COMER

*Attesting Officer*      *Acting Commissioner of Patents and Trademarks*